(12) United States Patent
Süss et al.

(10) Patent No.: US 8,850,729 B2
(45) Date of Patent: Oct. 7, 2014

(54) INSTRUMENT-DISPLAY WITH A TRANSPARENT APPLIQUÉ OVER A DISPLAY

(75) Inventors: Manfred Süss, Remchingen (DE); Joffrey Ringenwald, Strasbourg (FR); Pierre Henry, Cologne (DE); Patrick Alliot, Le Pecq (FR); Andreas Deubzer, Cologne (DE); Ingo Schmitz, Königswinter (DE)

(73) Assignee: Johnson Controls Technology Company, Holland, MI (US)

( * ) Notice: Subject to any disclaimer, the term of this patent is extended or adjusted under 35 U.S.C. 154(b) by 68 days.

(21) Appl. No.: 12/638,479

(22) Filed: Dec. 15, 2009

(65) Prior Publication Data

US 2010/0293827 A1   Nov. 25, 2010

(30) Foreign Application Priority Data

Dec. 16, 2008   (EP) ..................... 08021803

(51) Int. Cl.
*G09F 21/04* (2006.01)
*B60K 35/00* (2006.01)

(52) U.S. Cl.
CPC ................ *B60K 35/00* (2013.01); *G09F 21/04* (2013.01); *B60K 2350/203* (2013.01); *B60K 2350/206* (2013.01); *B60K 2350/2082* (2013.01)
USPC ............................................... 40/593; 40/594

(58) Field of Classification Search
USPC ..................................... 40/638, 594
See application file for complete search history.

(56) References Cited

U.S. PATENT DOCUMENTS

| | | | |
|---|---|---|---|
| 4,083,137 A * | 4/1978 | Rozmanith ..................... 40/772 |
| 5,248,536 A * | 9/1993 | Du Katz ....................... 428/42.1 |
| 6,481,127 B1 * | 11/2002 | Bilbie et al. ............... 40/299.01 |
| 2004/0154203 A1 * | 8/2004 | Bredow et al. .................. 40/638 |
| 2007/0040662 A1 | 2/2007 | Harada et al. |

FOREIGN PATENT DOCUMENTS

| | | |
|---|---|---|
| DE | 40 03 205 A1 | 8/1991 |
| DE | 102005 19 621 A1 | 1/2007 |
| EP | 0 806 633 A2 | 11/1997 |
| JP | 2002-156252 A | 5/2002 |
| JP | 2006-214953 A | 8/2006 |
| JP | 2006-234441 A | 9/2006 |
| WO | WO-2006/010473 A1 | 2/2006 |

\* cited by examiner

*Primary Examiner* — Joanne Silbermann
(74) *Attorney, Agent, or Firm* — Foley & Lardner LLP

(57) ABSTRACT

The present invention relates to a vehicle-display with a carrier-layer.

4 Claims, 1 Drawing Sheet

INSTRUMENT-DISPLAY WITH A TRANSPARENT APPLIQUÉ OVER A DISPLAY

CROSS REFERENCE TO RELATED APPLICATION

This application claims the benefit and priority from European Patent Application 08021803.5, filed Dec. 16, 2008, which is incorporated herein by reference in its entirety.

The present invention relates to a vehicle-display with a carrier-layer.

Such instrument-displays are well known in the state of the art and display for example the velocity of the vehicle, the temperature of the motor, the rotational speed of the motor and/or warning—or status signals of the vehicle. In most cases, the instrument display is a cluster of various displays. Especially with cluster displays, compromises had to be done regarding the display-quality of the various instruments.

It is therefore the problem of the present application to improve the quality of the various displays, the flexibility of the display cluster and to produce the inventive vehicle display as cost effective as possible.

The problem is solved with a vehicle-display with a carrier-layer, which comprises graphic-elements, whereas an appliqué is attached to the carrier-layer.

The present invention is related to a vehicle-display, which comprises a carrier-layer. This carrier-layer is preferably a thin plate or a film, more preferably made of a transparent material. The carrier-layer has enough mechanical stability to avoid deformation and/or destruction. However, it is desirable to design the carrier-layer as thin as possible. The carrier-layer comprises preferably graphical elements which are applied, preferably printed or etched, on the carrier layer. The graphic elements can be, for example, a scale, a geometrical element, a letter, a number and/or a symbol.

According to the present an appliqué is attached, preferably glued, on the carrier-layer, either on the side adjacent to the vehicle-occupants and/or on the reverse side. Preferably, the appliqué comprises a graphic-element. This graphic-element can be a supplement to the graphic-element displayed on the carrier-layer or an additional graphic-element. The graphic elements can be, for example, a scale, a geometrical element, a letter, a number and/or a symbol. Preferably, the appliqué comprises an opaque region.

Preferably, the appliqué itself is transparent and the graphic-elements and/or the opaque region are applied to, preferably printed and/or etched, on the appliqué.

Preferably, the appliqué is a, preferably transparent, film which more preferably comprises an adhesive layer. The adhesive layer allows to glue the appliqué on the carrier-layer.

Even more preferably, the appliqué is, at least essentially, congruent with the carrier-layer. Thus, no processing, like for example cutting, needs to be done to the appliqué after the graphic-elements or the opaque region have been applied to the appliqué and/or prior to gluing the appliqué to the carrier-layer.

The invention is now explained according to FIGS. 1a to 1c. These explanations do not limit the scope of protection.

Figure 1A:
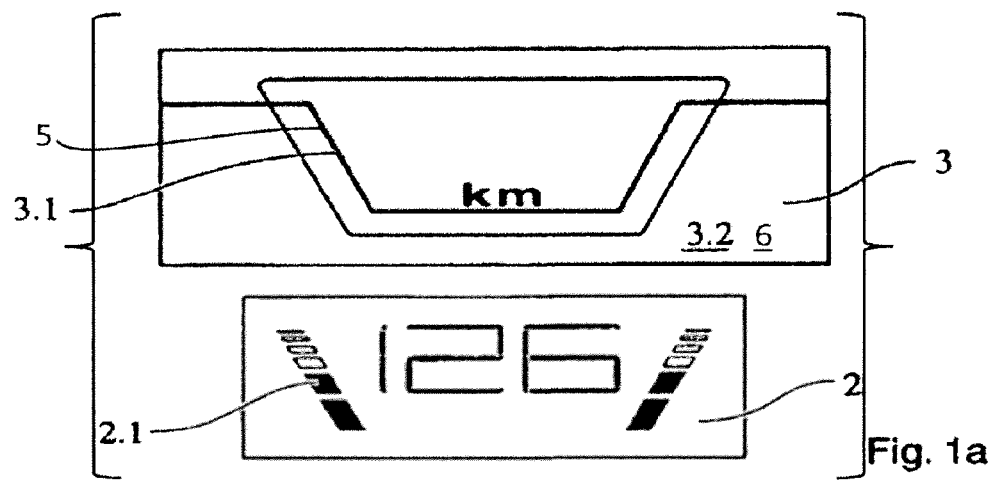
FIG. 1a shows the carrier-layer and the appliqué.
Figure 1B:
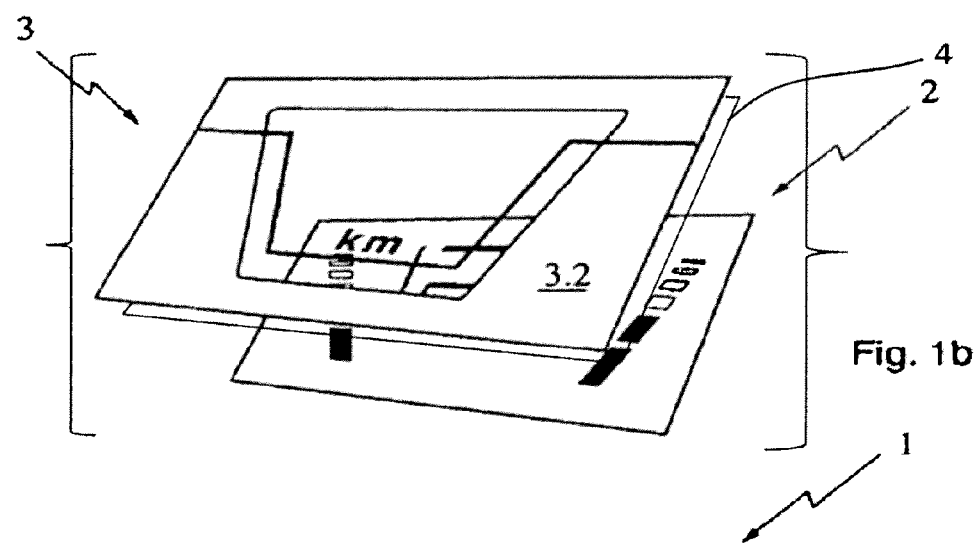
FIG. 1b shows the attachment of the appliqué to the carrier-layer.

FIG. 1 *a* shows the carrier-layer to which is in the present case a layer 2, which has enough mechanical stability to function as a display in a vehicle, so that it is not deformed and/or does not break. The carrier-layer can be either a thin plate of a relatively thick film. On this carrier-layer two graphical elements are printed, in the present case two bars and a display of a number, in the present case "126", which could be the velocity of the vehicle. Furthermore FIG. 1 *a* shows the appliqué 3, which comprises also graphic-elements 3.1, which may be a first etched portion 5, in the present case a rhomb and the letters "km" for kilometer. The rhomb is surrounded by an opaque region 3.2, which may be a second etched portion 6. The appliqué has the same width and the height as the carrier-display 2 below. Thus, the appliqué 3 and the carrier-layer 2 are congruent and no cutting needs to be done prior to gluing the appliqué to the carrier-layer.

FIG. 1 *b* shows the attachment of the appliqué 3 to the carrier-layer 2. Since the carrier-layer 2 and the appliqué 3 have the same size, the appliance of the appliqué to the carrier-layer 2 is very simple. In the present case the appliqué 3 is a thin film, that comprises on its down-side, which is adjacent to the carrier-layer, an adhesive layer 4. Prior to the attachment of the appliqué 3 to the carrier-layer 2, a protective layer (not depicted), which covers the adhesive layer 4 is removed from the appliqué prior to its application to the carrier-layer.

Figure 1C:
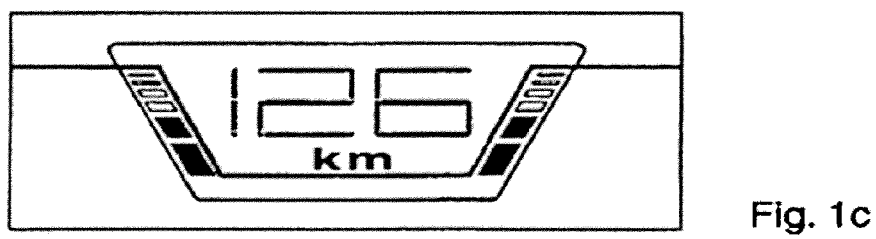
FIG. 1c shows the inventive vehicle-display.

FIG. 1c shows the inventive vehicle-display, which comprises in the present case the carrier-layer 2 and the appliqué 3. The person skilled in the art understands, that the inventive vehicle display can comprise more than one carrier-layer and/or more than one appliqué.

LIST OF REFERENCE SIGNS 1 vehicle-display
2 carrier-layer
2.1 graphic element, opaque region
3 appliqué
3.1 graphic element
3.2 opaque region
4 adhesive layer
5 first etched portion
6 second etched portion

The invention claimed is:
1. A vehicle-display comprising:
a carrier-layer that comprises graphic-elements for the vehicle-display,
wherein the carrier-layer comprises an etched portion that constitutes at least one of the graphic-elements; and
an appliqué attached to the carrier-layer,
wherein the appliqué comprises a first etched portion that constitutes first graphic-elements for the vehicle-display,
wherein the at least one of the graphic-elements of the carrier-layer or the first graphic-elements of the appliqué is a scale,
wherein the first graphic-elements of the appliqué are a supplement to the graphic-elements of the carrier layer,
wherein the appliquéfurther comprises an opaque region,
wherein the appliqué is transparent and the opaque region is applied to the appliqué,
wherein the appliqué is congruent with the carrier-layer,
wherein the appliqué is a film, and
wherein the film has an adhesive-layer.
2. The vehicle-display according to claim 1, wherein the appliqué further comprises a second etched portion that constitutes the opaque region.
3. The vehicle-display according to claim 1, wherein the appliqué further comprises a printed portion that constitutes the opaque region.

4. The vehicle-display according to claim 1, wherein the appliqué is transparent and further comprises a printed portion that constitutes second graphic-elements for the vehicle-display.

* * * * *